United States Patent
Xiang et al.

(10) Patent No.: US 12,401,491 B2
(45) Date of Patent: Aug. 26, 2025

(54) QUANTUM MEASUREMENT AND CONTROL SYSTEM FOR MULTI-BIT QUANTUM FEEDBACK CONTROL

(71) Applicants: Shenzhen Tencent Computer Systems Company Limited, Shenzhen (CN); Zhejiang University, Hangzhou (CN)

(72) Inventors: Liang Xiang, Shenzhen (CN); Yi Yin, Shenzhen (CN)

(73) Assignees: SHENZHEN TENCENT COMPUTER SYSTEMS COMPANY LIMITED, Shenzhen (CN); ZHEJIANG UNIVERSITY, Hangzhou (CN)

(*) Notice: Subject to any disclaimer, the term of this patent is extended or adjusted under 35 U.S.C. 154(b) by 975 days.

(21) Appl. No.: 17/498,671

(22) Filed: Oct. 11, 2021

(65) Prior Publication Data
US 2022/0150044 A1    May 12, 2022

Related U.S. Application Data

(63) Continuation of application No. PCT/CN2021/080602, filed on Mar. 12, 2021.

(30) Foreign Application Priority Data

Nov. 9, 2020   (CN) .......................... 202011239260.6

(51) Int. Cl.
*H04L 7/033*    (2006.01)
*G06N 10/00*    (2022.01)
*H04L 45/00*    (2022.01)

(52) U.S. Cl.
CPC ............. *H04L 7/033* (2013.01); *G06N 10/00* (2019.01); *H04L 45/40* (2013.01)

(58) Field of Classification Search
CPC .......... H04L 7/033; H04L 45/40; G06N 10/00
(Continued)

(56) References Cited

U.S. PATENT DOCUMENTS

| | | | |
|---|---|---|---|
| 6,647,026 | B1 | 11/2003 | Tanaka |
| 2013/0336435 | A1 | 12/2013 | Akkihal et al. |
| 2019/0251478 | A1 | 8/2019 | Bishop et al. |

FOREIGN PATENT DOCUMENTS

| | | | |
|---|---|---|---|
| CN | 104158515 A | * | 11/2014 |
| CN | 104901905 A | | 9/2015 |

(Continued)

OTHER PUBLICATIONS

The Japan Patent Office (JPO) Notification of Reasons for Refusal for Application No. 2021-547817 and Translation Feb. 9, 2023 12 Pages.

(Continued)

*Primary Examiner* — Austin Hicks
(74) *Attorney, Agent, or Firm* — ANOVA LAW GROUP PLLC

(57) ABSTRACT

A quantum measurement and control (QMC) system is provided. The QMC system a measurement and control (MC) network including a plurality of measurement and control subgroups (MCSGs), the each MCSG being configured to perform MC on a physical quantum bit (qubit) group, the each MCSG including a measurement unit and a plurality of control units, and each of the plurality of control units being configured to control one of the plurality of physical qubits, the measurement unit being configured to measure a quantum state of the one of the plurality of physical qubits, and transmit a control instruction to the each of the plurality of control units based on the quantum state as measured, and the each of the plurality of control units (Continued)

being configured to control the one of the plurality of physical qubits according to the control instruction.

18 Claims, 10 Drawing Sheets

(58) Field of Classification Search
USPC .......................................................... 706/62
See application file for complete search history.

(56) References Cited

FOREIGN PATENT DOCUMENTS

| CN | 109217939 A | 1/2019 |
|---|---|---|
| CN | 109800882 A | 5/2019 |
| CN | 111183433 A | 5/2020 |
| CN | 111713018 A | 9/2020 |
| JP | 2000101597 A | 4/2000 |
| JP | 2015524215 A | 8/2015 |
| WO | 2018089850 A1 | 5/2018 |

OTHER PUBLICATIONS

The World Intellectual Property Organization (WIPO) International Search Report for PCT/CN2020/080602 Aug. 5, 2021 12 Pages (including translation).

Anonymous, "Quantum Computing Control System," Zurich Instruments, Retrieved from the Internet:URL: https://www.zhinst.com/americas/quantum-computing-control-system-qccs, retrieved on Sep. 27, 2021. 9 pages.

Colm A. Ryan et al., "Hardware for dynamic quantum computing," arXiv:1704.08314, Apr. 26, 2017. 13 pages.

W. J. Dally et al., "Principles and Practices of Interconnection Networks," Morgan Kaufmann Publishers, 2003. 581 pages.

L. Xiang et al., "Simultaneous Feedback and Feedforward Control and Its Application to Realize a Random Walk on the Bloch Sphere in an Xmon-Superconducting-Qubit System," Physical Review Applied 14, 014099 (2020). 14 pages.

C. K. Andersen et al., "Repeated quantum error detection in a surface code," Nature Physics 16, 2020. 8 pages.

E. Knill, "Quantum computing with realistically noisy devices," Nature, vol. 434, 2005. 6 pages.

The European Patent Office (EPO) The Extended European Search Report for 21759007.4, May 27, 2022 13 pages.

Liang Xiang et al., "Simultaneous Feedback and Feedforward Control and Its Application to Realize a Random Walk on the Bloch Sphere in an Xmon-Superconducting-Qubit System," Physical Review Applied, vol. 14, No. 1, Jul. 31, 2020 (Jul. 31, 2020), p. 14099. 14 pages.

Asit K. Mishra et al., "A case for heterogeneous on-chip interconnects for CMPs," ACM SIGARCH Computer Architecture News, ACM Special Interest Group on Computer Architecture, 2 Penn Plaza, Suite 701 New York NY 10121-0701 USA, vol. 39, No. 3, Jun. 4, 2011 (Jun. 4, 2011), pp. 389-400. 11 pages.

Korean Intellectual Property Office (KIPO) Office Action 1 for Application No. 2021-7032064. Feb. 26, 2025. 19 Pages (including translation).

* cited by examiner

QUANTUM MEASUREMENT AND CONTROL SYSTEM FOR MULTI-BIT QUANTUM FEEDBACK CONTROL

RELATED APPLICATION(S)

This application is a continuation application of PCT Patent Application No. PCT/CN2021/080602, filed on Mar. 12, 2021, which claims priority to Chinese Patent Application No. 202011239260.6, entitled "QUANTUM MEASUREMENT AND CONTROL SYSTEM FOR MULTI-BIT QUANTUM FEEDBACK CONTROL" and filed on Nov. 9, 2020, all of which are incorporated herein by reference in entirety.

FIELD OF THE TECHNOLOGY

The present disclosure relates to the field of quantum technologies, and in particular, to a quantum measurement and control (QMC) system for multi-bit quantum feedback control.

BACKGROUND

A quantum chip is a core processing part of a quantum computer. In order to ensure that each quantum bit (qubit) on the quantum chip works in a correct manner, a QMC system may need to measure a quantum state of the each qubit on the quantum chip and run a quantum error correction (QEC) algorithm to perform error correction control on an erroneous qubit.

At present, a structural design of the QMC system is still in an exploratory stage.

SUMMARY

In one aspect, the present disclosure provides a quantum measurement and control (QMC) system. The QMC system includes a measurement and control (MC) network including a plurality of measurement and control subgroups (MCSGs), each MCSG being used as a node in the MC network and having a connection relationship with at least one another MCSG; the each MCSG being configured to perform MC on a physical quantum bit (qubit) group, and the physical qubit group including a plurality of physical qubits; the each MCSG including a measurement unit and a plurality of control units, and each of the plurality of control units being configured to control one of the plurality of physical qubits; the measurement unit being configured to measure a quantum state of the one of the plurality of physical qubits, and transmit a control instruction to the each of the plurality of control units based on the quantum state as measured; and the each of the plurality of control units being configured to control the one of the plurality of physical qubits according to the control instruction.

In another aspect, the present disclosure provides a method of performing measurement and control (MC) via a quantum measurement and control (QMC) system, the QMC system includes a plurality of measurement and control subgroups (MCSGs), each MCSG being used as a node in the MC network and having a connection relationship with at least one another MCSG, the method includes: performing, by the each MCSB, MC on a physical quantum bit (qubit) group, the physical qubit group including a plurality of physical qubits; controlling, by each of plurality of control units included in the each MCSG, one of the plurality of physical qubits; measuring, by the measurement unit, a quantum state of the one of the plurality of physical qubits, and transmitting, by the measurement unit, a control instruction to the each of the plurality of control units based on the quantum state as measured; and controlling, by the each of the plurality of control units, the one of the plurality of physical qubits according to the control instruction.

In yet another aspect, the present disclosure provides a non-transitory computer-readable storage medium storing computer program instructions executable by at least one processor of a quantum measurement and control (QMC) system to perform a method, the QMC system includes a plurality of measurement and control subgroups (MCSGs), each MCSG being used as a node in the MC network and having a connection relationship with at least one another MCSG, the method including: performing, by the each MCSB, MC on a physical quantum bit (qubit) group, the physical qubit group including a plurality of physical qubits; controlling, by each of plurality of control units included in the each MCSG, one of the plurality of physical qubits; measuring, by the measurement unit, a quantum state of the one of the plurality of physical qubits, and transmitting, by the measurement unit, a control instruction to the each of the plurality of control units based on the quantum state as measured; and controlling, by the each of the plurality of control units, the one of the plurality of physical qubits according to the control instruction.

The technical solutions provided in the embodiments of the present disclosure may bring the following beneficial effects:

A group of physical qubits share a set of hardware of an MC system by setting up an MCSG. A measurement unit in the MCSG directly generates an error correction code in the group and distributes feedback control signals to control units in the group, to implement quick feedback, thereby reducing an amount of communication between physical boards. In addition, a quantum operation on a superconducting quantum chip (SCQC) has a spatial locality, and the measurement unit in the MCSG can forward more measurement results of this group to other adjacent MCSGs with a lower delay. Setting up the MCSG may minimize a communication delay of a system network and a running time of a QEC algorithm.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
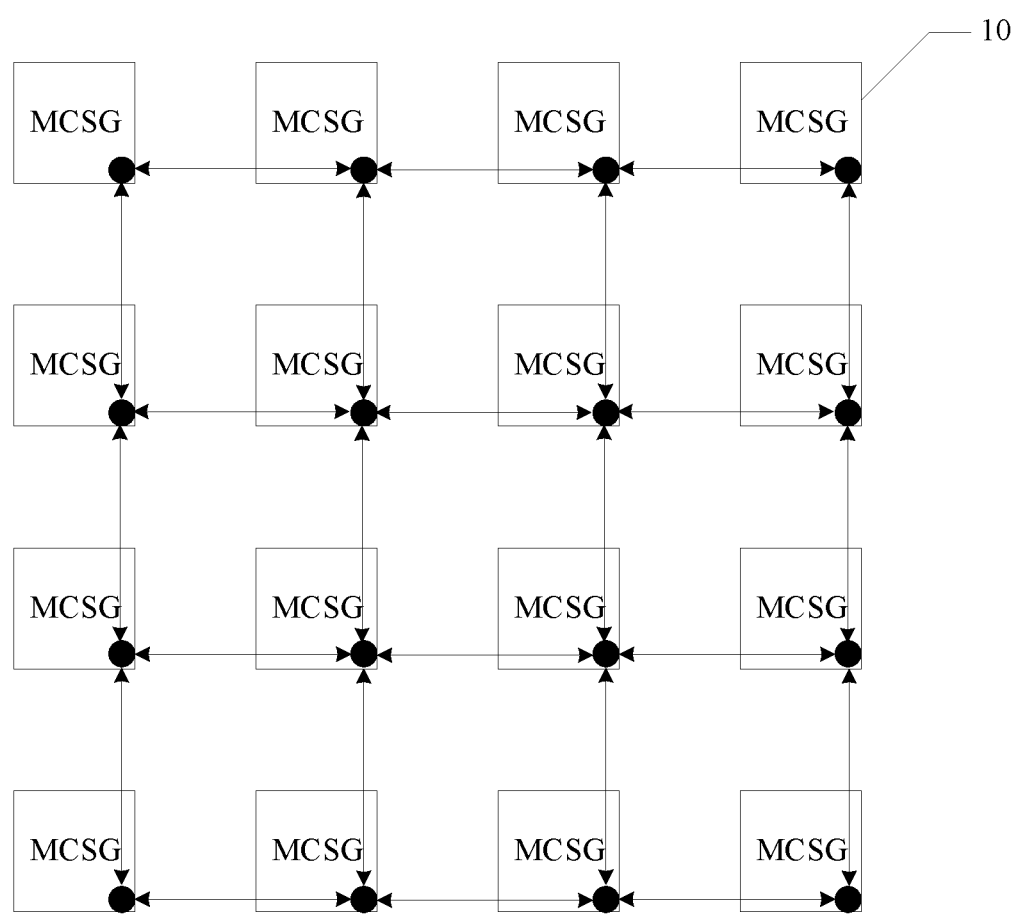
FIG. 1 is a schematic diagram of a QMC system for multi-bit quantum feedback control according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Cloud technology is a hosting technology that gathers a series of resources such as hardware, software, and networks in a wide area network or a local area network to implement computing, storage, processing, and sharing of data.

The cloud technology is a generic term for a network technology, an information technology, an integration technology, a management platform technology, an application technology, and the like based on an application of a cloud computing business mode. A resource pool may be formed, and resources are used based on a requirement, which is flexible and convenient. A cloud computing technology becomes an important support. A backend service of a technical network system requires a large amount of computing and storage resources, such as a video website, an image website, and more portal websites. As the Internet industry is highly developed and applied, each article may have its own identifier in the future, which may need to be transmitted to a backend system for logical processing. Data at different levels is separately processed, and data in various industries requires strong system support, which can be implemented through cloud computing.

The cloud technology involves basic technologies such as cloud computing, cloud storage, databases, and big data. Cloud applications provided based on the cloud technology include medical cloud, cloud IoT, cloud security, cloud calling, private cloud, public cloud, hybrid cloud, cloud gaming, cloud education, cloud conference, cloud social, artificial intelligence cloud services, and the like. With the development of cloud technologies and the application of cloud technologies in different fields, an increasing number of cloud applications appear.

Generally, a system based on a cloud technology includes a server and a terminal. The server may be an independent physical server, or may be a server cluster or a distributed system including a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of the present disclosure.

A quantum computer is a machine that uses the principles of quantum mechanics to perform computations. Based on a superposition principle and quantum entanglement of the quantum mechanics, the quantum computer has a strong parallel processing capability and can resolve some problems that are difficult for a classical computer to compute. Because of a zero-resistance characteristic of a superconducting quantum bit (SC qubit) and a manufacturing process close to that of an integrated circuit, a quantum computing (QC) system constructed using the SC qubit is one of the most promising systems for implementing practical QC.

A quantum processor refers to a quantum-level computer processor, that is, a processor of a quantum computer. The quantum processor may include one or more quantum chips.

The quantum chip (or an SCQC) is a central processing unit of the quantum computer and is a core part of the quantum computer. The quantum chip integrates quantum circuits on a substrate, to carry a function of quantum information processing. Drawing lessons from the development of a computer, after overcoming the bottleneck technology in quantum computer research, it may be necessary to move onto integration to achieve commercialization and industrial upgrading. A superconducting system, a semiconductor quantum dot system, a micro-nano photonics system, and even an atomic and ion system are all expected to move onto chips. From the perspective of development, an SCQC system is technically ahead of other physical systems, and the semiconductor quantum dot system is also an objective that people try to explore, because the development of the semiconductor industry is already mature, for example, once a semiconductor quantum chip breaks a threshold of fault-tolerance quantum computing (FTQC) in terms of decoherence time and manipulation accuracy, it is expected to integrate existing achievements of the semiconductor industry to reduce development costs.

In view of advantages of the quantum computer, a system constructed based on a cloud technology in the future can use the quantum computer to perform some processing and computations to provide better services.

In certain embodiments, the term "quantum computing" (QC) refers to a computing method that uses quantum state superposition and entanglement phenomena in quantum mechanics to run an algorithm and perform a computation.

In certain embodiments, the term "quantum bit" (qubit) refers to a two-level quantum system, which is a basic unit of QC, and can be implemented on different physical carriers. In the present disclosure, the "qubit" is briefly referred to as a "bit" in some paragraphs, but a person skilled in the art can understand its meaning.

In certain embodiments, the term "superconducting quantum bit" (SC qubit) refers to a qubit based on a superconducting quantum circuit, which is designed and prepared by using micro-nano processing technologies. Through a classical microwave pulse signal, the SC qubit can be controlled and a quantum state can be measured.

In certain embodiments, the term "quantum circuit model" refers to a model that decomposes a QC process into a series of quantum gate operations on a plurality of qubits.

In certain embodiments, the term "superconducting quantum chip" (SCQC) refers to a chip that integrates a plurality of SC qubits to implement a quantum circuit model.

In certain embodiments, the term "dispersive readout" refers to a method for measuring a quantum state of an SC qubit. In this method, a beam of combined microwave pulses is sent from a microwave measurement device, and states of the plurality of SC qubits are detected simultaneously through dispersive coupling between a microwave transmission line and the plurality of SC qubits.

In certain embodiments, the term "physical qubit" refers to a qubit implemented on an actual physical carrier, for example, an SC qubit. In the present disclosure, the "physical qubit" is briefly referred to as a "physical bit" in some paragraphs, but a person skilled in the art can understand its meaning.

In certain embodiments, the term "physical quantum gate" refers to a quantum gate that works on a physical qubit.

In certain embodiments, the term "quantum error correction" (QEC) refers to a situation where an operation on a qubit is susceptible to noise and dissipation caused by an environment, resulting in an erroneous result. A process of measuring an error and performing appropriate feedback control on a quantum system based on a result to obtain a correct result is referred to as QEC.

In certain embodiments, the term "logical qubit" refers to a situation where to implement QEC, a plurality of physical qubits work as a group in an SCQC to execute a QEC algorithm in the multi-bit group, so that quantum information of a logical subspace defined in an entire Hilbert space of this SC qubit group is protected by error correction. In such a working mode, the plurality of physical qubits may be combined into a logical qubit. In the present disclosure, the "logical qubit" is briefly referred to as a "logical bit" in some paragraphs, but a person skilled in the art can understand its meaning.

In certain embodiments, the term "logical quantum gate" refers to a quantum gate that works on a logical qubit.

In certain embodiments, the term "fault-tolerance quantum computing" (FTQC) refers to a situation where because an actual SCQC is subject to inevitable system dissipation and environmental noise interference, people may need to design an appropriate QEC solution, so as to use a logical qubit under error correction protection to carry and process quantum information. This QC process is also referred to as FTQC.

In certain embodiments, the term "quantum program" refers to a series of quantum manipulation and measurement instructions. The quantum program may be a high-level quantum programming language that can effectively express complex quantum algorithms, or may be machine code that directly runs on a specific processor.

In certain embodiments, the term "quantum compiler" refers to software responsible for interpreting a quantum programming language into MC instructions and generating specific machine code.

In certain embodiments, the term "quantum measurement and control (QMC) system" refers to a system configured to run a quantum program to implement some of or all quantum algorithms. The QMC system is responsible for connecting a classical computer and a quantum chip. Some QMC systems are integrated with a classical computer.

In certain embodiments, the term "analog-to-digital (AD) conversion circuit" refers to a type of electronic circuit module, which is responsible for receiving an analog signal within a specific frequency range and converting the analog signal into a digital signal.

In certain embodiments, the term "digital-to-analog (DA) conversion circuit" refers to a type of electronic circuit module, which is responsible for converting a digital signal into an analog signal within a specific frequency range and outputting the analog signal.

In certain embodiments, the term "field programmable gate array (FPGA) board" (printed circuit board (PCB) based on FPGA) refers to a hardware circuit board with an FPGA chip as a main control chip. A plurality of AD conversion circuits and DA conversion circuits may be arranged around the circuit board. The FPGA chip is responsible for generating and reading digital signals, and processing the digital signals in a low latency and high concurrency manner by using a programming characteristic of hardware of the FPGA chip. The FPGA board is a core component of a QMC system.

In certain embodiments, the term "hardware virtualization" refers to a virtualizing MC hardware. Virtualization hides real hardware from a user, which acts as an abstract control platform.

In certain embodiments, the term "transmit channel" (TX channel) refers to a virtual channel configured to transmit any microwave signal within a specific bandwidth range. The TX channel may be actually deployed on an FPGA board with a DA conversion circuit.

In certain embodiments, the term "receive channel" (RX channel) refers to a virtual channel configured to receive a microwave signal within a specific bandwidth range. The RX channel may be actually deployed on an FPGA board with an AD conversion circuit.

In certain embodiments, the term "measurement unit" refers to a basic unit configured to measure a plurality of SC qubits in a group. In an implementation, the measurement unit includes a pair of RX channels and a pair of TX channels, which generates and receives measurement pulses based on dispersive readout, and obtains a quantum state of a qubit according to a read digital measurement signal. The measurement unit can simultaneously measure quantum states of a plurality of qubits by synthesizing dispersion pulses.

In certain embodiments, the term "control unit" refers to a basic unit configured to control an SC qubit. In an implementation, the control unit includes three TX channels, which respectively correspond to three components X, Y, and Z of a Pauli matrix controlling a two-level system. In addition, if an SCQC includes a tunable coupler, a TX channel may be added to adjust an operating bias voltage of the coupler.

In certain embodiments, the term "measurement and control subgroup" (MCSG) refers to a working group formed by interconnecting a measurement unit and a plurality of control units, which is a network node of the present disclosure. Each MCSG is responsible for measuring a plurality of physical qubits in the group, transmitting measurement results to other network nodes, processing measurement results, running a feedback algorithm, generating feedback control signals, and distributing the feedback control signals to control units in the group, to implement feedback control.

In certain embodiments, the term "two-dimensional mesh network" refers to a data transmission network that may be adopted by a QMC system in the present disclosure. Each network node is connected to four adjacent nodes through a router.

In certain embodiments, the term "wormhole router" refers to a router responsible for serial transmission of data between nodes. The wormhole router is deployed on a measurement unit of each MCSG, and measurement result data and a synchronization pulse signal can be transmitted from any node in the network to another node through the wormhole router. A delay of the wormhole router is in a unit of clock cycle and may be calculated.

In certain embodiments, the term "measurement and control instruction set architecture" (MC ISA) refers to an instruction set system that directly interacts with physical resources. The MC ISA defines a machine opcode and an operand that may be used for generating a microwave measurement pulse of a measurement unit and a quantum gate operation pulse of a control unit, and a basic command executed by a QMC system.

In certain embodiments, the term "multiple instruction, multiple data" (MIMD) refers to a technology in which MC units concurrently and synchronously run quantum programs. In a running phase of a program, different units can simultaneously execute different instructions and manipulate different data.

In certain embodiments, the term "global system clock synchronization" refers to a manner to implement synchronization of digital signal transmission. Clocks of system modules are derived from the same reference clock, which have an equal frequency and a stable phase difference. The global system clock synchronization is different from a signal source synchronization technology.

At present, integration of a scalable SCQC has reached a range of 50-100 bits. Using a Sycamore architecture of Google as an example, a plurality of qubits are arranged by using a two-dimensional structure. Each qubit and a quantum coupler between bits may need to be controlled by an independent microwave pulse signal. Measurement of a quantum state of the qubit mostly adopts a dispersive readout manner, and each combined pulse measurement signal transmitted by a measurement device can simultaneously read states of a plurality of qubits. QEC is a foundation of universal QC. A surface code error correction method that is mature in theory depends on measurement of a logical qubit including a group of physical qubits, and performs feedback control on a measured or adjacent physical bit according to a measurement result.

With a QEC algorithm proposed, a QMC system may need to meet the following requirements.

In terms of hardware, the QMC system may need to support rapid index iteration and networking reconstruction of a hardware board, for example, use higher-speed AD and DA conversion circuits, so that a hardware index of a microwave MC system may be easily improved without affecting interfaces of the system and a computer and an operating manner of the system.

In terms of software and a computer system, the QMC system may need to quickly deploy the latest instruction set, or even macro instructions, to perform automatic error correction protection for a logical bit. The QMC system may need to provide a general feedback control model and a running synchronization control model to maximize utilization of hardware storage resources and signal bandwidth resources.

The present disclosure provides a QMC system for multi-bit quantum feedback control. In the present disclosure, through a two-dimensional mesh network, a signal feedback delay in an MCSG is shortened to O(1), and a total feedback delay of a system including N MCSGs is shortened to $O(N^{0.5})$. A manner of network coordinate addressing is adopted in combination with a wormhole router and a virtual channel multiplexing technology, thereby avoiding signal transmission congestion between network nodes and improving network bandwidth utilization. In the present disclosure, in each MCSG, a measurement unit and a control unit are virtualized from an FPGA board. The units can be freely networked and expanded independently from hardware of the system, which is beneficial to improving hardware resource utilization.

The present disclosure plays a great role in a hardware MC system of QC. Based on a system architecture provided in the present disclosure, it is easy to integrate and iterate hardware components of a multi-bit MC system, develop and improve an instruction set and a compiler for quantum feedback control, construct a running environment of a QMC system, and run a QEC algorithm, to implement FTQC.

FIG. 1 is a schematic diagram of a QMC system for multi-bit quantum feedback control according to an embodiment of the present disclosure. The system may include an MC network including a plurality of MCSGs 10.

Each MCSG 10 is used as a node in the MC network and has a connection relationship with at least one another MCSG 10.

In this embodiment of the present disclosure, the MC network includes a plurality of nodes, and each node corresponds to one MCSG 10. The nodes are connected according to a particular rule to form a two-dimensional or three-dimensional network structure.

For example, as shown in FIG. 1, the MC network is a two-dimensional mesh network structure. That is, the MC network includes a plurality of nodes distributed in an array structure of M rows×N columns, both M and N being integers greater than 1. Nodes located at four vertexes of the two-dimensional mesh network are connected to two adjacent nodes. Nodes located on four edges of the two-dimensional mesh network (except the nodes at the vertexes) are connected to three adjacent nodes. Nodes located on neither vertexes nor edges of the two-dimensional mesh network are connected to four adjacent nodes. In addition, a direction of each connection coincides with a rectangular coordinate, thus forming an array structure distribution of M rows×N columns.

Each MCSG 10 is configured to perform MC on a physical qubit group, the physical qubit group including a plurality of physical qubits. For example, a quantum chip includes a plurality of physical qubits (for example, more than 50 or even more than 100), the plurality of physical qubits are divided into a plurality of physical qubit groups, and each physical qubit group includes a plurality of physical qubits. In addition, the numbers of physical qubits included in any two physical qubit groups may be the same or different, which is not limited in this embodiment of the present disclosure.

In addition, in this embodiment of the present disclosure, the MC refers to measuring a quantum state of a physical qubit, and performing some feedback control on the physical qubit based on a measurement result. For example, by measuring the quantum state of the physical qubit, it is determined whether the quantum state of the physical qubit is erroneous, and when it is determined that the quantum state is erroneous, error correction control is performed on the quantum state of the physical qubit.

Figure 2:
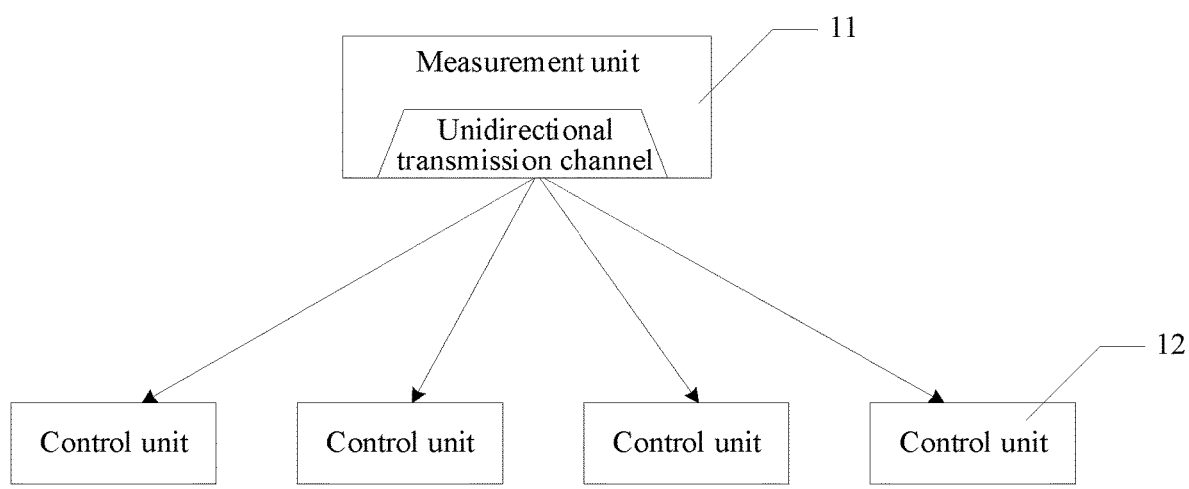
FIG. 2 is a schematic diagram of a tree-like connection manner of an MCSG according to one or more embodiments of the present disclosure.

In this embodiment of the present disclosure, the MCSG 10 and the physical qubit group are in a one-to-one correspondence. Each MCSG 10 is configured to perform MC on a physical qubit group corresponding to the MCSG 10. In certain embodiments, as shown in FIG. 2, the MCSG 10 includes a measurement unit 11 and a plurality of control units 12, each control unit 12 being configured to control one physical qubit.

The measurement unit 11 is configured to measure a quantum state of each physical qubit in the physical qubit group corresponding to the MCSG 10, and transmit a control instruction (in some paragraphs of the present disclosure, the control instruction is also referred to as a "feedback control signal") to the control unit 12 based on a measurement result. The control unit 12 is configured to control a corresponding physical qubit according to the control instruction.

For example, if a physical qubit group corresponding to an MCSG 10 includes five physical qubits, the MCSG 10 may include one measurement unit 11 and five control units 12. The measurement unit 11 is configured to measure quantum states of the five physical qubits, and generate a control instruction based on a measurement result. The five control units 12 and the five physical qubits are in a one-to-one correspondence, and each control unit 12 is configured to control a physical qubit corresponding to the control unit 12. For example, after receiving the control instruction transmitted by the measurement unit 11, the control unit 12 controls the corresponding physical qubit to perform a corresponding operation according to the control instruction.

During hardware implementation of the MCSG 10, a corresponding physical circuit may be designed to implement a corresponding function. In certain embodiments, the function of the MCSG 10 may be implemented by designing a corresponding FPGA board. FPGA is a product of further development on the basis of programming devices such as programming array logic (PAL) and generic array logic (GAL). The FPGA emerges as a semi-custom circuit in the application-specific integrated circuit (ASIC) field, which overcomes shortcomings of a custom circuit, and shortcomings of a limited number of gate circuits of an original programming device.

In addition, there is a bidirectional data transmission channel between two MCSGs 10 having a connection relationship. For example, there is a bidirectional data transmission channel between measurement units 11 of the two MCSGs 10 having a connection relationship. After obtaining a measurement result, a measurement unit 11 of one MCSG 10 may transmit the measurement result to a measurement unit 11 of the other MCSG 10 through the data transmission channel, to share measurement results among the MCSGs 10. In certain embodiments, the data transmission channel between the MCSGs 10 can be configured to transmit other data in addition to the measurement result, which is not limited in this embodiment of the present disclosure.

In certain embodiments, a physical connection (that is, a physical transmission channel) is established between the two MCSGs 10 (for example, the measurement units 11 of the two MCSGs 10) to implement the bidirectional data transmission channel through the physical connection. There may be different ways of implementing the physical connection. For example, general input and output pins of FPGA of adjacent MCSGs 10 (for example, measurement units 11) may be directly interconnected by simply using a cable, or a twisted pair may be used for interconnection, or a high-speed serial unit of the FPGA is used and an optical fiber/coaxial cable is used as a physical channel to further improve a data transmission rate of a single channel. In the present disclosure, no special requirements are imposed on the hardware implementation, and a user selects different connection solutions according to different hardware restrictions or system parameter requirements.

In addition, in order to implement a two-dimensional mesh network topology, a minimum number of connection channels on a board can be set to 4×2=8 (for example, there are 4 directions: east, south, west, and north, and there is a bidirectional data transmission channel in each direction, so the number of connection channels is 8). Obviously, with more connection channels provided on the board, more information may be transmitted in parallel, a bandwidth of a network is larger, and a propagation delay of data exchanged between MCSGs is smaller, which is more beneficial to achieving low-delay quantum feedback control.

At present, because the promising SCQC mostly aggregates SC qubits in a manner of a planar grid, if the MC system uses the same structure (that is, a two-dimensional planar network structure, as the two-dimensional mesh network structure shown in FIG. 1), a one-to-one correspondence between a location of an MC channel and a location of a controlled physical qubit may be implemented, to facilitate programming control. In addition, in a multi-bit quantum gate operation, coupling between physical qubits that are adjacent to each other is used, and the physical qubits that are adjacent to each other are generally used for encoding logical qubits. In the present disclosure, by setting up an MCSG, a group of physical qubits share a set of hardware of an MC system, to utilize a spatial locality of a quantum operation. In this way, a transmission delay of a system feedback signal and an amount of communication between physical boards may be minimized. A requirement of a QEC algorithm is to quickly perform quantum state measurement on a plurality of physical qubits, generate an error correction code and a feedback control signal according to a measurement result, and distribute the error correction code and the feedback control signal to a control unit. In the present disclosure, by setting up the MCSG, a measurement unit in the MCSG may transmit less measurement results of the group to another MCSG, but directly generate error correction codes in the group and distribute feedback control signals to control units in the group, to implement quick feedback. Setting up the MCSG can effectively utilize a system bandwidth and reduce a delay.

For example, the MC system controls 4×4=16 physical qubit groups, as shown in FIG. 1. Each MCSG 10 is responsible for a group of physical qubits located close to each other. A signal transmission delay in the MCSG 10 is a constant. Therefore, physical qubits used in QEC can be regarded as a controlled group, and a gate operation of a logical qubit can be implemented in the group.

In addition, in the present disclosure, MCSGs are expanded into an MC network, so that the MC network may be expanded in sequence and has characteristics of scalability and reconfigurability to meet the requirements of running a quantum feedback algorithm on a large number of (for example, more than 100) physical qubits.

The following describes an internal interconnection manner of the MCSG 10. For example, according to a resource situation of a physical board (the following uses the FPGA board as an example), it may be determined whether to use a plurality of physical boards as an MCSG 10 in a networking manner.

In certain embodiments, a measurement unit and a control unit in the same MCSG are deployed in the same physical board. When or in response to determining that hardware resources of the FPGA board are sufficient, for example, the number of channels of AD conversion circuits and DA conversion circuits meets MC requirements for all physical qubits in a physical qubit group corresponding to an MCSG 10, an MCSG 10 including one measurement unit 11 and a plurality of control units 12 may be virtualized based on the FPGA board. In certain embodiments, an intra-group interconnection structure may not be necessary. All data processing units of the virtual measurement unit and control units are deployed in the same FPGA board (or referred to as an FPGA chip), and nodes naturally share information in the board without transmitting the information through an inter-board transmission channel.

In certain embodiments, the measurement unit and the control unit in the same MCSG are deployed in different physical boards, and there is a unidirectional inter-board transmission channel between the measurement unit and the control unit. Regarding limited hardware resources of the FPGA board, for example, each board can be used to virtualize only one measurement unit 11 or two control units 12, an appropriate intra-group interconnection structure may need to be designed, to distribute a control signal generated by the measurement unit 11 to a corresponding control unit 12. In certain embodiments, a tree-like subgroup structure can be adopted. As shown in FIG. 2, a measurement unit 11 is a parent node, and control units 12 are child nodes. The parent node is connected to each child node through a unidirectional transmission channel (WR channel) (here the emphasis is on an inter-board transmission channel). The transmission channel is responsible for transmitting a synchronization trigger signal and a feedback control signal transmitted from the measurement unit 11 to the control unit 12. In a networking mode of a system, the transmission channel is also responsible for writing data and instructions into the control unit.

In actual implementation, first, how many physical qubits that each MCSG may need to be responsible for may be planned, and how many control units and measurement units may be needed and board resources required by each unit are analyzed according to a bit control requirement. When resources of an FPGA board are sufficient, an MCSG may be implemented on the FPGA board. In certain embodiments, it may not be needed for more boards to combine to implement an MCSG. In certain embodiments, for example, when an existing FPGA boards can implement only one measurement unit or one control unit, it may be considered that more FPGA boards are required to be connected in a specific manner to form a subnet (a tree structure shown in FIG. 2) of an MCSG. The FPGA board in which the measurement unit is located is used as a main unit of the MCSG, and carries a router of a system network node.

To sum up, in the technical solutions provided in the embodiments of the present disclosure, a group of physical qubits share a set of hardware of an MC system by setting up an MCSG. A measurement unit in the MCSG directly generates an error correction code in the group and distributes feedback control signals to control units in the group, to implement quick feedback, thereby reducing an amount of communication between physical boards. In addition, a quantum operation on an SCQC has a spatial locality, and the measurement unit in the MCSG can forward more measurement results of this group to other adjacent MCSGs with a lower delay. Setting up the MCSG may minimize a communication delay of a system network and a running time of a QEC algorithm.

In addition, some special error correction code solutions may need to use a plurality of physical qubit groups. Therefore, implementation of an error correction code depends on cooperative work of a plurality of MCSGs in the present disclosure. To meet universality, a measurement result of an MCSG may need to be quickly transmitted to adjacent nodes through a network. In the present disclosure, because there is a bidirectional data transmission channel between two MCSGs having a connection relationship, the measurement result may be transmitted through the data transmission channel between the MCSGs, to meet the above implementation requirements.

Corresponding system configuration is required for a QMC system provided in the embodiments of the present disclosure. In certain embodiments, the following two aspects of system configuration are included: (1) node coordinate configuration; and (2) node memory configuration.

(1) Node Coordinate Configuration

An MCSG is configured with corresponding node coordinates, and the node coordinates are used for identifying a location of the MCSG in an MC network. In certain embodiments, using the foregoing two-dimensional mesh network as an example, the node coordinates may include a horizontal coordinate (X coordinate) and a vertical coordinate (Y coordinate). An X coordinate and a Y coordinate of each node (MCSG) may be respectively configured through DIP switches on a physical board (for example, an FPGA board).

In certain embodiments, each node can read its node coordinates according to a first DIP switch and a second DIP switch on the FPGA board. The first DIP switch is configured to set a horizontal coordinate (X coordinate) of the node, and the second DIP switch is configured to set a vertical coordinate (Y coordinate) of the node. For example, a DIP switch sw_x[7:0] is configured to set the X coordinate of the node, and a DIP switch sw_y[7:0] is configured to set the Y coordinate of the node. [7:0] is the wording of a hardware bit width, which means that there are 8 bits, and the most significant bit is in front. A user manually sets values of the DIP switches, for example, sw_x=0, sw_y=1, then the coordinates of this node are set to a first row and a second column, and so on.

In certain embodiments, an identifier is assigned to each measurement unit, and the identifier includes the node coordinates corresponding to the MCSG to which the measurement unit belongs. For example, by programming the FPGA, a media access control (MAC) address (which is not necessarily in a form of a MAC address, but may be another custom identifier of a network node) is assigned to each measurement unit, and the last byte of the address and the coordinates of the node are in a one-to-one correspondence. For example, a MAC address DE:AD:BE:EF:00:31 represents a node located in a second column and a fourth row; and a MAC address DE:AD:BE:EF:00:00 represents a node located at a coordinate origin (that is, a first column and a first row). The user may use a computer to access a memory of a node through an Ethernet/peripheral component interconnect express (PCIe, a high-speed serial computer expansion bus) interface, to directly configure a register and debug a target node. The register herein is responsible for storing working state information that may need to be quickly obtained when a program is running, for example, an identity (ID), a delay, and a feedback threshold of a node. Debugging nodes means to individually test and configure a working state of each node in an early period of a system configuration process.

(2) Node Memory Configuration

The MCSG is configured with a corresponding memory space, and the measurement unit and the control unit in the same MCSG share the memory space. In a networking mode of a system, the measurement unit may transmit a write instruction to the control unit to write data of a quantum program and a control waveform into a memory of the control unit.

In an MC network, each node has an independent memory space. In the same MCSG, all units (including the measurement unit and the control unit) share such a memory. According to the number of memory resources required by each unit when running the quantum program, an independent memory addressing range is allocated to the each unit, to facilitate memory access from a user or another node.

For example, 2048 KB of memory space is allocated to a measurement unit, and a total of 8192 KB of memory space is evenly allocated to eight control units. Then memory allocation in an MCSG may be shown in Table 1 below (a 32-bit memory address is used as an example herein):

TABLE 1

| | |
|---|---|
| 0x0000_0000~0x001F_FFFF | Measurement unit 0 |
| 0x0020_0000~0x002F_FFFF | Control unit 1 |
| 0x0030_0000~0x003F_FFFF | Control unit 2 |
| 0x0040_0000~0x004F_FFFF | Control unit 3 |
| 0x0050_0000~0x005F_FFFF | Control unit 4 |
| 0x0060_0000~0x006F_FFFF | Control unit 5 |
| 0x0070_0000~0x007F_FFFF | Control unit 6 |
| 0x0080_0000~0x008F_FFFF | Control unit 7 |
| 0x0090_0000~0x009F_FFFF | Control unit 8 |

In this embodiment of the present disclosure, the node coordinate configuration and node memory configuration are performed on the MC network, so that each node has its own node coordinates and memory space, which facilitates communication between nodes, and storage and access of node-related information.

Extremely strong phase coherence is required for regulating a microwave signal of an SCQC. To perform a multi-bit gate operation, for a control unit in an MC network, all TX channels of the control unit may need to transmit control microwaves at exactly the same time. To perform measurement, for a measurement unit in the MC network, a time difference may need to be maintained between a read pulse and a measurement window of the measurement unit. Feedback control and an error correction algorithm require strict synchronization of a time sequence between control units and a measurement unit that are used for a plurality of bits.

To meet the requirements, the present disclosure proposes to use the following three synchronization technologies in combination:

(1) Trigger Synchronization of Network Nodes

To make all nodes in the MC network to start working in the same clock cycle, the present disclosure provides a synchronization solution in which a master node is used to sequentially trigger slave nodes. The main idea is to set a node in the MC network as a master node for synchronization, for example, a node with coordinates (0, 0) is set as master node, and nodes at the remaining coordinates are set as the slave nodes to be triggered. When a system starts to work, the master node is responsible for sequentially transmitting synchronization trigger signals to the slave nodes. Each slave node waits for a plurality of clock cycles according to a sequence of the synchronization trigger signals received, and then starts to work. In this way, global synchronization may be implemented by configuring the number of waiting cycles for each node.

In an exemplary embodiment, a node at a target location in the MC network is a master node, and nodes at other locations are slave nodes. In the MC network, the number of master nodes is one, and nodes other than the master node are all slave nodes. For example, a node with coordinates (0, 0) may be selected as a master node. In certain embodiments, a node at another location may alternatively be selected as a master node. This is not limited in this embodiment of the present disclosure. The master node is configured to transmit a synchronization trigger signal to each slave node. The slave node is configured to determine a clock cycle for starting work according to a clock cycle of the received synchronization trigger signal and a pre-configured number of waiting cycles. Clock cycles for starting work of the nodes in the MC network are the same.

In certain embodiments, using a 4×4 mesh network as an example, a node at a coordinate origin (0, 0) is set as a master node. A measurement unit of the master node sequentially transmits synchronization trigger signals to all slave nodes in the MC network according to a transmission rule (an X coordinate is prioritized over a Y coordinate) specified by a network router. For example, a definition of a synchronization trigger signal is shown in Table 2 below:

TABLE 2

| | |
|---|---|
| X = N[1:0] − 1 | Y = 3[1:0] |
| (X coordinate of a slave node in an $N^{th}$ column) | (maximum value of a Y coordinate in a network − 1) |

For example, a synchronization trigger signal of a node located in a fourth column of a mesh is (X=3, Y=3). The master node first transmits the synchronization trigger signal, and according to the rule of the router, the synchronization trigger signal is sequentially transmitted to slave nodes located at (3, 0), (3, 1), (3, 2), and (3, 3). Similarly, the master node then sequentially transmits synchronization trigger signals of a third column, a second column, and a first column, and sequentially triggers the slave nodes in the columns:

(X=2, Y=3) (2, 0), (2, 1), (2, 2), (2, 3)

(X=1, Y=3) (1, 0), (1, 1), (1, 2), (1, 3)

(X=0, Y=3) (0, 0), (0, 1), (0, 2), (0, 3)

To calculate the number of waiting clock cycles for each node, it is still assumed that a channel width of the network is 4 (the channel width may be the number of bits that may be transmitted in a clock cycle). Each synchronization trigger signal herein includes exactly 4 bits. In certain embodiments, a delay of a synchronization trigger signal transmitted from one node to another node is one clock cycle. As shown in Table 3 below, a trigger waiting configuration table of a network node may be obtained:

TABLE 3

| Clock cycle waited for node trigger | X = 0 | X = 1 | X = 2 | X = 3 |
|---|---|---|---|---|
| Y = 0 | 4 | 4 | 4 | 4 |
| Y = 1 | 3 | 3 | 3 | 3 |
| Y = 2 | 2 | 2 | 2 | 2 |
| Y = 3 | 1 | 1 | 1 | 1 |

In the network node (MCSG), if the measurement unit and the control units are all deployed on one FGPA board, all units share a synchronization trigger signal of the node at which the units are located, and wait for the same number of clock cycles and then simultaneously start working. If inter-board interconnection may be needed in the MCSG, the FPGA board on which the measurement unit is located may be used as a master synchronization unit. The master synchronization unit distributes synchronization trigger signals to the control units through inter-board interconnection channels. After receiving the synchronization trigger signal, the control unit waits for a pre-configured number of clock cycles to compensate for a delay of inter-board interconnection communication, to finally implement synchronization of all MC units in the MCSG.

(2) Sampling Clock Synchronization of AD/DA Conversion Circuit

Network node trigger synchronization ensures that the control unit and the measurement unit simultaneously generate and receive digital waveforms at a relatively rough timescale of an FPGA clock cycle. Synchronization requirements for an analog waveform are more stringent. To ensure accuracy of MC, time uncertainty of sampled signals of all waveforms may need to be less than 50 ps.

To resolve this problem, the present disclosure adopts a system clock synchronization solution. The QMC system provided in the embodiments of the present disclosure further includes a reference clock source and a clock distributor. The reference clock source is configured to generate a system reference clock. The clock distributor is configured to distribute the system reference clock to a phase-locked loop (PLL) of each physical board. The PLL is configured to generate working clocks of the measurement unit and the control unit on the physical board, and generate sampling clocks of the AD conversion circuit and the DA conversion circuit on the physical board.

Figure 3:
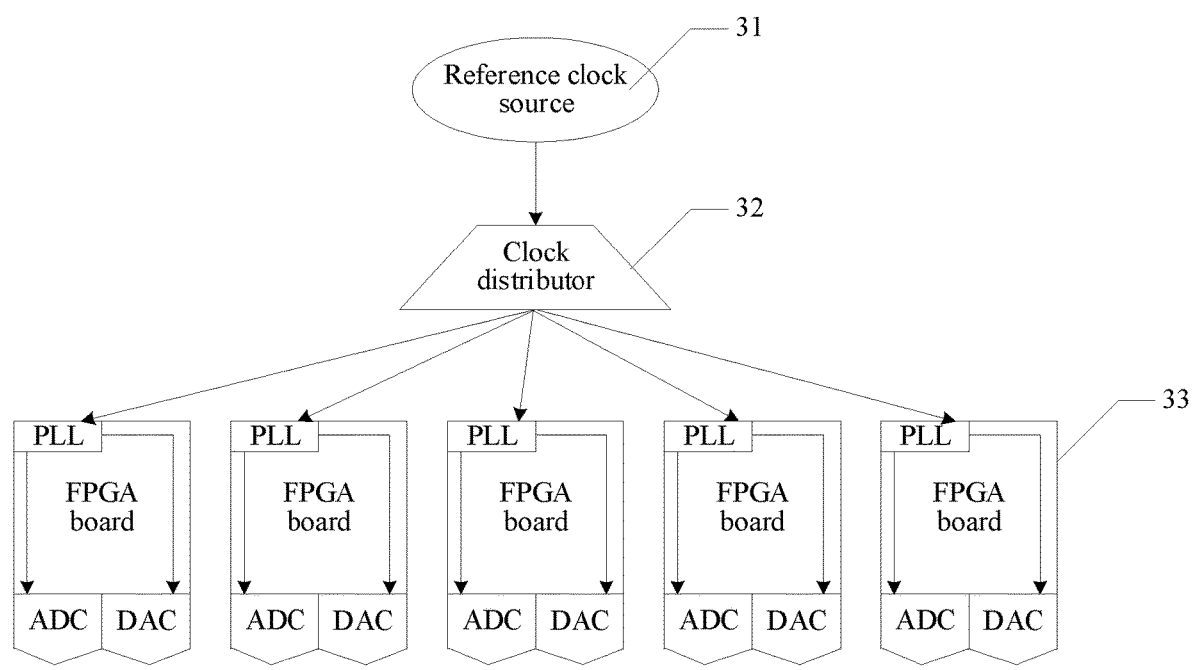
FIG. 3 is a schematic diagram of a system clock synchronization solution according to one or more embodiments of the present disclosure.

As shown in FIG. 3, a low-noise reference clock source 31 is first used, and a clock distributor 32 is then used to respectively connect reference clocks outputted by the clock source to FPGA boards 33. Each FPGA board has a PLL. Under configuration of a user host, the PLL locks a phase of a sampling clock generated by a board with a phase of a reference clock inputted from outside. Obviously, performance indexes of the reference clock source and the PLL determine coherence and stability of the sampling clocks of all AD/DA conversion circuits in the system, and finally determine quality of phase synchronization of a TX channel and a RX channel.

(3) Software Compensates for a Random Phase Difference of an Analog Signal

According to the foregoing two synchronization technologies, it may be expected that the MC units in the system start working simultaneously, and phase differences of microwaves generated/received by all channels are stable (phase noise has been controlled within an appropriate range). However, because of uncertainty of an initial phase difference of the PLL after each power-on, and different lengths of analog signal transmission lines (for reference clock and microwave output), after the system reaches certain form of stability, an output microwave may have a specific phase difference. In this embodiment of the present disclosure, a random phase difference between the MCSGs is compensated for by using software. For example, before running a quantum program, software is used to compensate for such a random phase difference, to finally implement phase synchronization.

In an implementation, a microwave detection device is used to simultaneously capture pulses outputted by channels, extract delays between the channels, compensate for the delays on a computer, and transmit compensated digital waveform data to each unit, to synchronize phases of a plurality of channels.

In the present disclosure, a problem of calibration of random phase differences is resolved through hardware and software cooperation, which can simplify hardware design and improve stability of the system.

To implement measurement-based quantum feedback control, a measurement result of a controlled physical qubit may need to be quickly obtained, and a feedback control signal may need to be generated according to the measurement result. Then the control signal is distributed to a control unit to perform feedback control. Methods for transmitting the measurement result and the feedback signal are introduced herein with reference to the network architecture of the present disclosure.

(1) Feedback Control in an MCSG

To run a QEC algorithm on an SCQC, an existing QEC theory proposes to use an error correction code to encode a logical qubit. For example, a QEC code [[n,k,d]] represents to use n physical qubits to encode k logical qubits, to correct any $(d-1)/2$ errors that occur on any single qubit. In the present disclosure, such n physical qubits on the SCQC are used as a controlled subgroup, and the QEC algorithm is run in the subgroup.

Quantum feedback control in the MCSG is an important part of the QEC algorithm. To implement the quantum feedback control, first, a measurement unit transmits a synthesized dispersion pulse to the SCQC. The synthesized dispersion pulse is used for dispersive readout and is synthesized from pulses of different frequencies and amplitudes. Each pulse is responsible for measuring a physical qubit. An RX channel of the measurement unit synchronously receives a returned dispersion pulse carrying quantum state information through coupling between an SC qubit and a microwave transmission line. Subsequently, an AD conversion circuit samples and measures an echo pulse, and transmits a digitized waveform to a processor of the measurement unit. The processor extracts, from the waveform, a feature phase and an amplitude of a signal at a bit reading frequency, and then compares obtained feature information with a state determining threshold, to obtain a quantum state (0 or 1) of the SC qubit.

Based on the measurement result of the quantum state of the SC qubit in the group, the measurement unit then runs a specific quantum feedback algorithm (for example, qubit initial state preparation, or feedback error correction based on a stabilizer code) to generate a feedback control signal and transmit the feedback control signal to the control unit, to perform a feedback operation. In an implementation, the feedback control signal is transmitted only to a control unit corresponding to an erroneous physical qubit.

A tree-like MCSG interconnection is used as an example to illustrate a manner in which the measurement unit distributes feedback control signals. After a feedback algorithm is performed, the measurement unit obtains a control tag of each qubit (assuming that a tag value is 0 or 1, which is used for distinguishing two different feedback operations), and distributes a control tag of the SC qubit (that is, the foregoing feedback control signal) to a corresponding control unit of the SC qubit. In certain embodiments, a signaling format of the feedback control signal includes a first field and a second field, the first field being used for filling a start bit of the feedback control signal, and the second field being used for filling a code bit of the feedback control signal. A definition of the signaling format of the feedback control signal can be shown in Table 4 below:

TABLE 4

| 1 | Bit0 |
|---|---|

The first field is on the left, and the second field is on the right. A length of the first field may be 1 bit, and the first field is the start bit of the feedback control signal (for example, represented by 1), which indicates the arrival of the feedback control signal. A length of the second field may also be 1 bit, and the second field is the code bit of the feedback control signal. The control unit selects a feedback operation to be performed according to information encoded in the second field. In certain embodiments, a value of the second field is 0 or 1, which respectively represent two different tag values. When the number of feedback operations that may need to be supported is greater than 2, the number of code bits of the feedback control signal may be increased.

(2) Sharing of Measurement Results Between Network Nodes

Some special error correction code solutions may need to use a plurality of physical qubit blocks. Therefore, implementation of an error correction code depends on cooperative work of a plurality of MCSGs in the present disclosure. To meet universality, a measurement result of an MCSG may need to be quickly transmitted to adjacent nodes through a network.

The following describes a manner of sharing measurement results between nodes by using a 4×4 network as an example. A format of a network transmission data packet of a measurement result is first defined. The data packet is transmitted in a point-to-point manner, that is, any measurement unit in the system may transmit a data packet including a measurement result to any node through a network. A definition of the data packet of the measurement result is as follows. Each measurement unit has 8 measurement channels (that is, quantum states of 8 physical bits are simultaneously measured), so that feedback data occupies 8 bits. In addition, 8 bits are occupied by a coordinate part of the data packet. Therefore, a total length of the data packet is 16 bits. For example, a format of a data packet transmitted between MCSGs is shown in Table 5 below:

TABLE 5

| X coordinate [1:0] of destination | Y coordinate [1:0] of destination | X coordinate [1:0] of source | Y coordinate [1:0] of source | Feedback data [7:0] |
|---|---|---|---|---|

A data packet transmitted from a first MCSG to a second MCSG includes: coordinate information of a source node (including node coordinates corresponding to the first MCSG), coordinate information of a destination node (including node coordinates corresponding to the second MCSG), and data content. The coordinate information of the source node includes an X coordinate (2 bits) and a Y coordinate (2 bits) of the source node. The coordinate information of the destination node includes an X coordinate (2 bits) and a Y coordinate (2 bits) of the destination node. The data content corresponds to the feedback data in Table 5, which has 8 bits.

Similarly, assuming that a width of a channel between network nodes is 4 (that is, a 4-bit signal may be transmitted simultaneously in each direction), a data packet may need to be decomposed into four parts to be sequentially transmitted to a destination node. When an MCSG obtains required measurement results of all physical qubits, a measurement unit starts to execute a quantum feedback algorithm, and the subsequent feedback control process is described above.

To ensure that a synchronization trigger signal and a feedback control signal are transmitted most efficiently in a limited bandwidth network, in the present disclosure, a wormhole router and a virtual channel flow control method are designed for a QMC network.

(1) Wormhole Router

In an exemplary embodiment, a wormhole router is integrated in a measurement unit of an MCSG, the wormhole router includes a plurality of ports, and a physical transmission channel (for example, a bidirectional data transmission channel) is formed through corresponding ports between wormhole routers of two MCSGs having a connection relationship. The wormhole router is configured to split a data packet into flits of a fixed length and transmit the flits.

Figure 4:
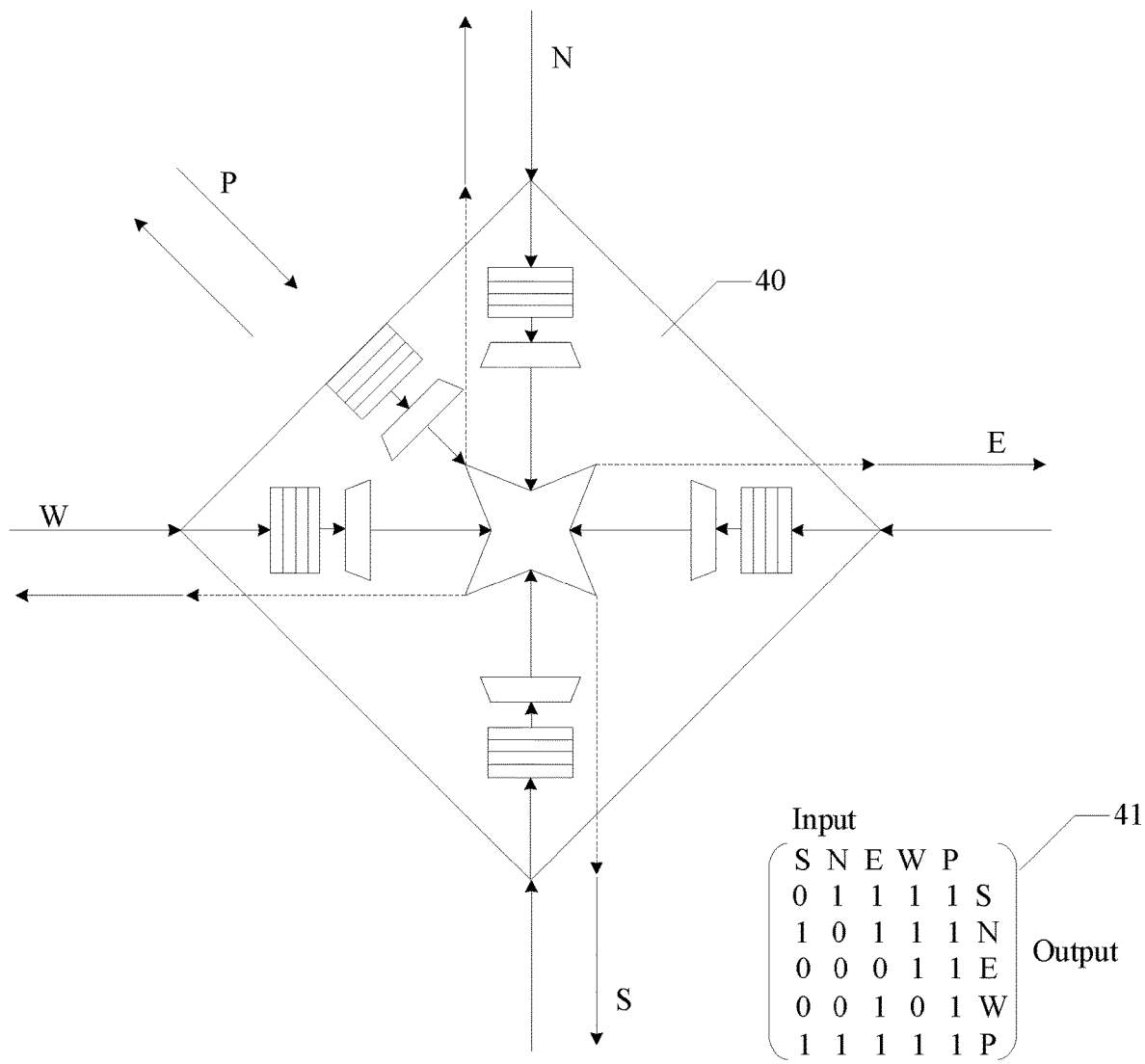
FIG. 4 is a schematic structural diagram of a wormhole router according to one or more embodiments of the present disclosure.

In the present disclosure, the router is integrated on a physical board on which a measurement unit of each network node (MCSG) is located. The router can control a flow direction and volume of a data packet in a network. A schematic diagram of a wormhole router 40 is shown in FIG. 4, and the router herein has an order of 5, respectively corresponding to 5 transmission directions: east (E), west (W), south (S), north (N), and a processor (P) of the router.

In actual system networking, the number of physical transmission channels between nodes is limited. Therefore, a data packet may not be completely transmitted in one clock cycle. In the present disclosure, the wormhole router is used to resolve the foregoing problem. A function of the wormhole router is to decompose a relatively long network data packet into flits of a relatively small fixed length. A width of the flit is equal to the number of bits that can be simultaneously transmitted in a network (that is, a bit width of a connection channel in one direction, which may be as small as 4 bits or even 2 bits). Therefore, the wormhole router is applicable to an inter-board communication network with limited hardware resources.

In addition, to avoid network congestion, a dimension-prioritized signal transmission policy is adopted in a router design, which can prove that this method can well balance load on a network channel involving non-uniform traffic mode (for example, replacement traffic, n-to-one transmission, or one-to-n transmission), and can keep a path length as short as possible to reduce an average delay of data packets. Dimensionally ordered routing usually does not include transmission from a second dimension to a first dimension. For example, for routing with an X coordinate prioritized over a Y coordinate, a data packet may never be propagated from a Y direction to an X direction. Therefore, a request from (north, south) to (west, east) never exists in the router. A diagram at the lower right corner of FIG. 4 shows a routing matrix 41 corresponding to the wormhole router 40 shown in FIG. 4, where a direction P may be particular in a network, which represents a node itself. The node itself can access any direction (including the direction P) of the router of the node, and can be accessed by any other direction.

In certain embodiments, a System Verilog hardware description language is used to design the router, a logic circuit is generated through a digital synthesis tool, and the router is finally implemented on an FPGA. Moreover, in addition to a two-dimensional mesh, the router also supports multi-dimensional topological connections, and a width of a flit can also be changed according to an actual number of physical layer channels.

In the present disclosure, an example in which a width of a physical channel is 4 bits is used herein, to analyze a propagation process of 8-bit feedback data in a 4×4 network. A transmission policy of the router is that an X coordinate is before a Y coordinate.

Figure 5:
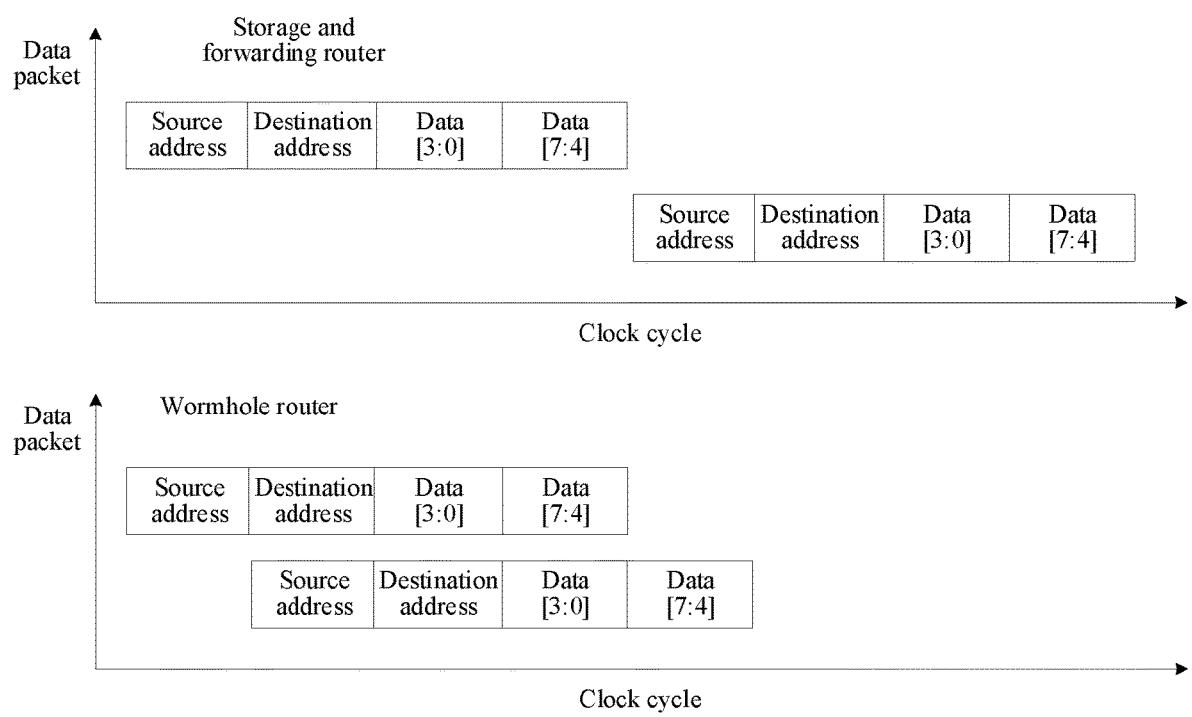
FIG. 5 is a working sequence diagram of two routers according to one or more embodiments of the present disclosure.

For example, a node located at (0, 0) may need to continuously transmit two feedback data packets to nodes (0, 2) and (0, 3). Then, both data packets pass through a router located at a node (0, 1), and occupy a W-to-E routing channel. An advantage of the wormhole router over a general buffering-transmitting router is that the wormhole router can move a flit to a next node without storing an entire data packet. Therefore, in this example, as shown in FIG. 5, the router may need to buffer only a first flit of the data packet, that is, an X/Y coordinate of a destination node, to determine a transmission direction of a next flit. For each data packet, a total delay of the router is 2(3)+4 clock cycles. 2(3) is a network transmission delay of a first (second) feedback data packet, which is proportional to the number of nodes through which information passes. 4 is a data conversion delay, which is proportional to the number of flits of the data packet. Therefore, when many network data packets in the same direction may need to pass through the router, the network data packets are transmitted to respective destination nodes in a pipeline manner. Compared with the buffering-transmitting router, this design can better use a bandwidth of a transmission channel and reduce an average delay of a plurality of signals transmitted on a network.

(2) Virtual Channel Flow Control

In an exemplary embodiment, a bidirectional data transmission channel between two MCSGs having a connection relationship may include two unidirectional data transmission channels. That is, assuming that there is a connection relationship between the first MCSG and the second MCSG, there are a unidirectional data transmission channel 1 and a unidirectional data transmission channel 2 between the first MCSG and the second MCSG. In addition, a direction of the unidirectional data transmission channel 1 is from the first MCSG to the second MCSG, and a direction of the unidirectional data transmission channel 2 is from the second MCSG to the first MCSG.

Each unidirectional data transmission channel corresponds to a plurality of virtual transmission channels. When or in response to determining that data packets from different transmission paths use the same unidirectional data transmission channel, the data packets from different transmission paths occupy different virtual transmission channels, and data transmission is performed in sequence between the virtual transmission channels according to a set flow control policy.

Considering scarcity of physical interconnection, a width of each channel may be so small that a plurality of flits cannot be simultaneously transmitted. When the router transmits a data packet, a port channel used by the router is occupied. In certain embodiments, requests of other data packets to the router are suspended, and the data packets are temporarily stored in a buffer at a front end of the router and wait for transmission, until a previous data packet is entirely transmitted to a next node.

Such first-come, first-served channel flow control may cause network congestion. For example, in FIG. 6, a node with coordinates (2, 2) transmits a feedback control signal to a node (0, 2), and a node with coordinates (1, 0) also transmits a feedback control signal to the node (0, 2). Obviously, both data packets may need to occupy an N port of a router of a node (1, 2). The data packet from the node (2, 2) arrives at the router (1, 2) first, and is processed first. Assuming that during transmission, the destination node (0, 2) cannot receive the data packet from the node (2, 2) temporarily, the N port and an S port of the router (1, 2) are blocked, and transmission of the data packet from the node (1, 0) is further blocked. It is conceivable that because the transmission of the second data packet cannot be performed in time, the second data packet occupies network channel resources for a long time, further resulting in deterioration of service quality of other routers, and finally, an entire network is increasingly congested.

To resolve this problem, in the present disclosure, a manner of virtual channel flow control is adopted, so that different virtual channels share the same physical channel. That is, on an existing physical channel, a plurality of independent channels that can be used are virtualized. Network packets from different transmission paths can occupy any virtual transmission channel so that the same physical channel is multiplexed for different network packets. In certain embodiments, a cyclic fair flow control policy is used to control priorities of responses of the virtual channel, that is, each network packet has the same possibility to obtain a virtual channel service and pass through a router on a path of the network packet. Such a virtual channel flow control solution can evenly allocate bandwidth resources of the physical channel.

Figure 6:
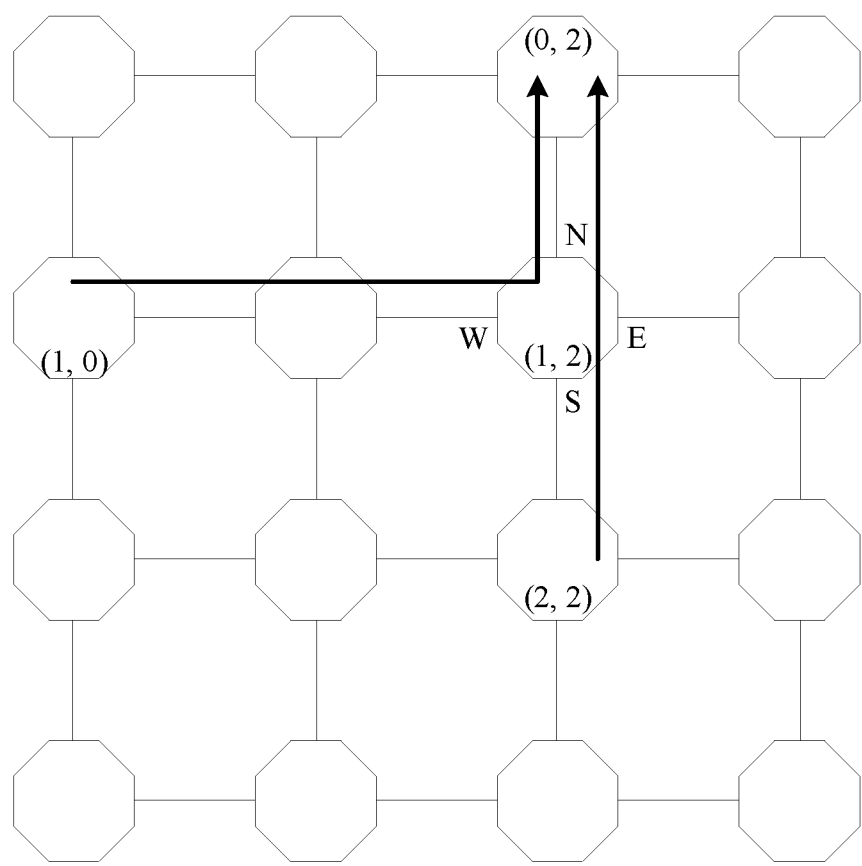
FIG. 6 is a schematic diagram of virtual channel flow control according to one or more embodiments of the present disclosure.

Signal flows in FIG. 6 are still used as an example. When a first flit from the node (2, 2) is transmitted from the router (1, 2) to the node (0, 2), a first flit from the node (1, 0) and a second flit from the node (2, 2) simultaneously request to pass through the N port of the router (1, 2). In certain embodiments, a flow control module of the router chooses to respond to a request from the S port or a W port according to the cyclic fair policy. Assuming that the first flit from the node (2, 2) passes through the router at first, the first flit from the node (1, 0) passes through the router next, and so on. In summary, two feedback signals pass through the router (1, 2) in a cross-passing manner. As shown in Table 6 below:

TABLE 6

| Clock Cycle | 0 | 1 | 2 | 3 | 4 | 5 | 6 | 7 | 8 | 9 |
|---|---|---|---|---|---|---|---|---|---|---|
| Flit Routed | (2, 2) #1 | (1, 0) #1 | (2, 2) #2 | (1, 0) #2 | (2, 2) #3 | (1, 0) #3 | (2, 2) #4 | (1, 0) #4 | (2, 2) #5 | (1, 0) #5 |

If in a fourth clock cycle, transmission of the data packet from the node (2, 2) cannot be performed temporarily, and the transmission is resumed just after the data packet transmission at the node (1, 0) is performed, trajectories of the two feedback signals are shown in Table 7 below:

TABLE 7

| Clock Cycle | 0 | 1 | 2 | 3 | 4 | 5 | 6 | 7 | 8 | 9 |
|---|---|---|---|---|---|---|---|---|---|---|
| Flit Routed | (2, 2) #1 | (1, 0) #1 | (2, 2) #2 | (1, 0) #2 | (1, 0) #3 | (1, 0) #4 | (1, 0) #5 | (2, 2) #3 | (2, 2) #4 | (2, 2) #5 |

Obviously, this manner reduces a probability of network congestion and effectively increases a bandwidth of the router, thereby reducing an overall network delay. In addition, this method can also reduce data that may need to be buffered at the router and the node, saving memory resources of an FPGA.

Figure 7:
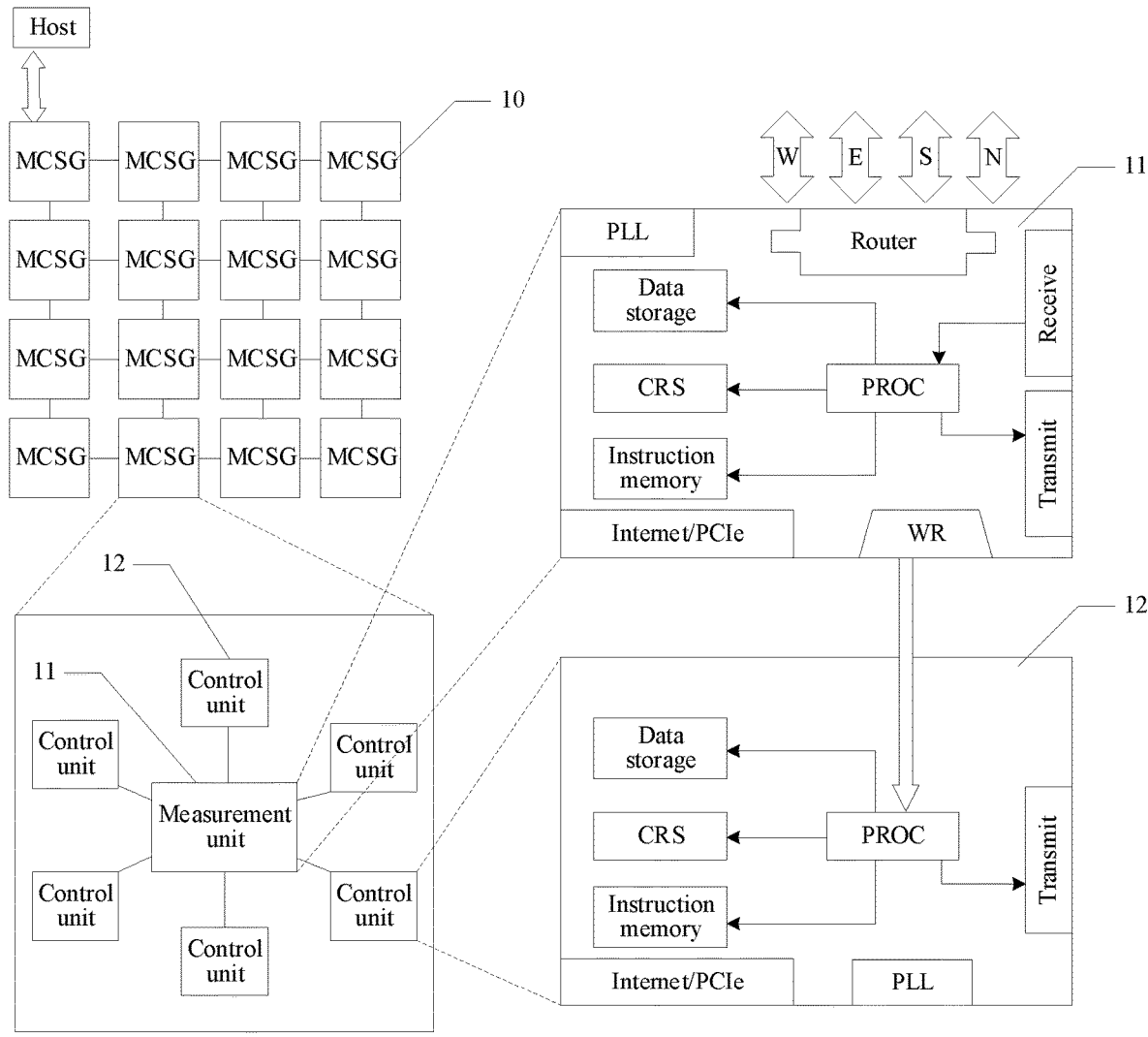
FIG. 7 is a hierarchical diagram of system composition of a QMC system according to one or more embodiments of the present disclosure.

FIG. 7 is a hierarchical diagram of system composition of a QMC system according to the present disclosure. The QMC system includes an MC network including a plurality of MCSGs 10. Each MCSG 10 includes one measurement unit 11 and a plurality of control units 12, and circuit structures of the measurement unit 11 and the control unit 12 are shown in FIG. 7.

In certain embodiments, the measurement unit in each MCSG is connected to a computer through a PCIe interface or an Ethernet interface, and is individually configured and debugged by a host. The entire system can also work in a networking mode, that is, only one node is connected to the computer, while the remaining nodes indirectly perform data exchange with the host through a mesh network of the entire system. For example, in the foregoing figure, in the present disclosure, a node (0, 0) is selected to be connected to the host.

Figure 8:
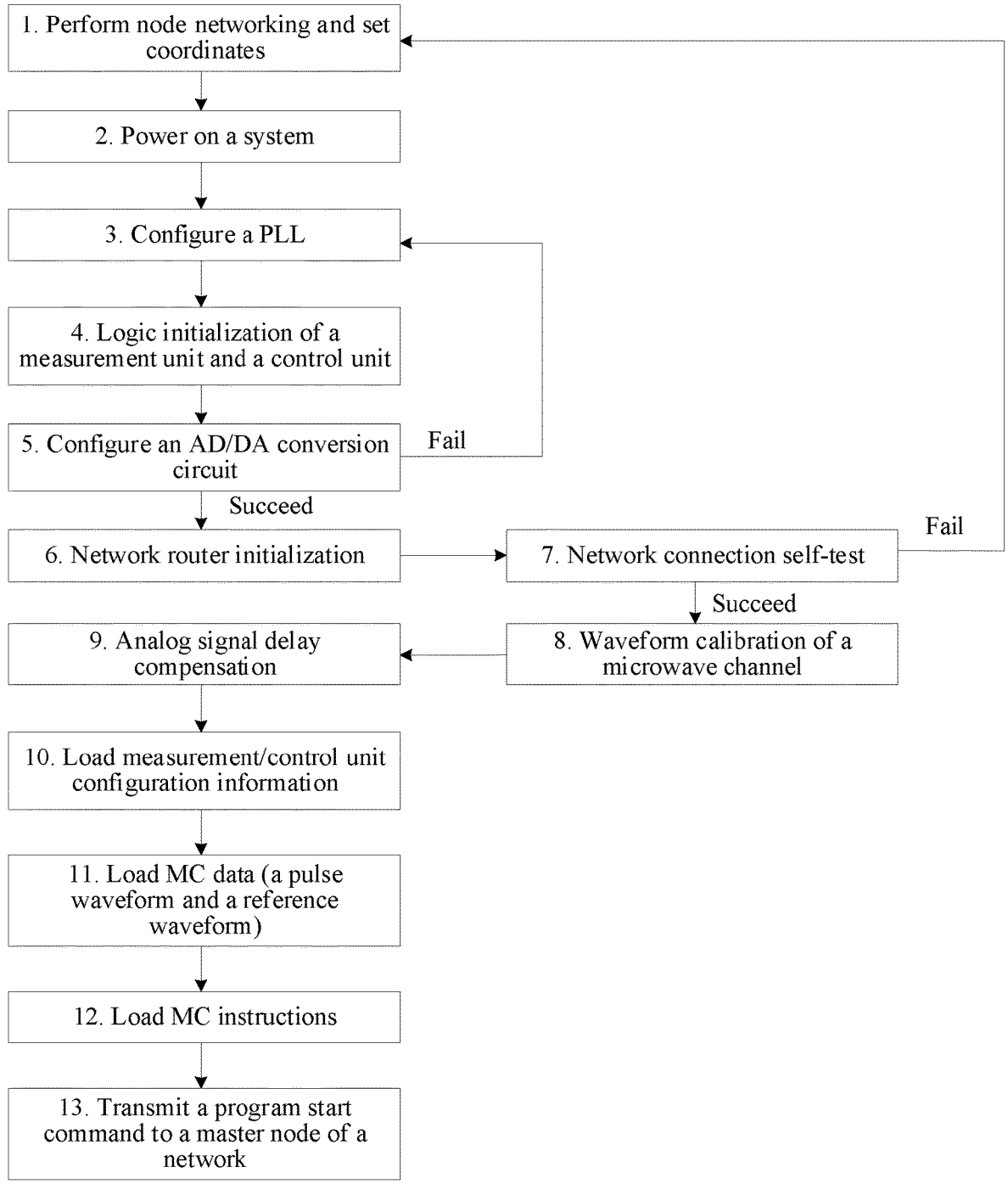
FIG. 8 is a schematic diagram of a system configuration process according to one or more embodiments of the present disclosure.

Before running a quantum program, the entire system may need to be configured to work in an appropriate state, and data and instructions are loaded to run the quantum program. FIG. 8 depicts a process of configuring the system.
 1. Perform node networking and set coordinates.
 2. Power on the system.
 3. Configure a PLL.
 4. Logic initialization of a measurement unit and a control unit.
 5 Configure an AD/DA conversion circuit.
 6. Network router initialization.
 7. Network connection self-test.
 8. Waveform calibration of a microwave channel.
 9. Analog signal delay compensation.
 10. Load measurement/control unit configuration information.
 11. Load MC data (a pulse waveform and a reference waveform).
 12. Load MC instructions.
 13. Transmit a program start command to a master node of a network.

According to a distributed architecture of the system, in the present disclosure, an MIMD program running manner is selected. First, in the present disclosure, an instruction set applicable to an MIMD model is defined, which may include two types.

One of the types is a transmit instruction (TXI) set, which directly specifies a generation sequence of pulses, as shown in Table 8 below:

TABLE 8

| opcode | index0 | Index1 | address0 | address1 |
|---|---|---|---|---|

1. opcode is an operation code, indicating a type of an instruction. If op=0, a processor (PROC) terminates execution of an instruction. If op=1, after a current instruction is performed, the PROC executes a next instruction. If op=2, when a current instruction is performed, the PROC jumps to an instruction at index0. If op=3, when a current instruction is performed, the PROC jumps to an instruction requested according to a received feedback tag. A mark of a next instruction may need to be valid before the end of the current instruction.
 2. index0 and index1 are addresses of a next instruction, and use a tag as a condition.
 3. address0 and address1 determine a segment of a waveform in a block random access memory (BRAM). A digital waveform sequence starts from address0 and ends at address1.

The other type is a receive instruction (RXI) set, which directly specifies a sequence of digital signal processing, as shown in Table 9 below:

TABLE 9

| opcode | delay | length | pointer |
|---|---|---|---|

1. opcode is an operation code of a measurement channel in a measurement unit. If op=0, the PROC terminates execution of an instruction. If op=1, after a current instruction is performed, the PROC executes a next instruction.
 2. delay is a delay of a measurement window, that is, the number of clock cycles that may need to be waited from start of this program to start of each measurement window.
 3. length is a time length of a measurement window, that is, a clock cycle that each measurement window lasts.
 4. pointer is a pointer of a measurement parameter. When the measurement channel executes this item, the PROC reads, from a memory of the measurement unit pointed to by the pointer, parameter information used for digital signal processing of the measurement window, for example, a demodulation reference waveform and a coefficient of a digital filter.

Figure 9:
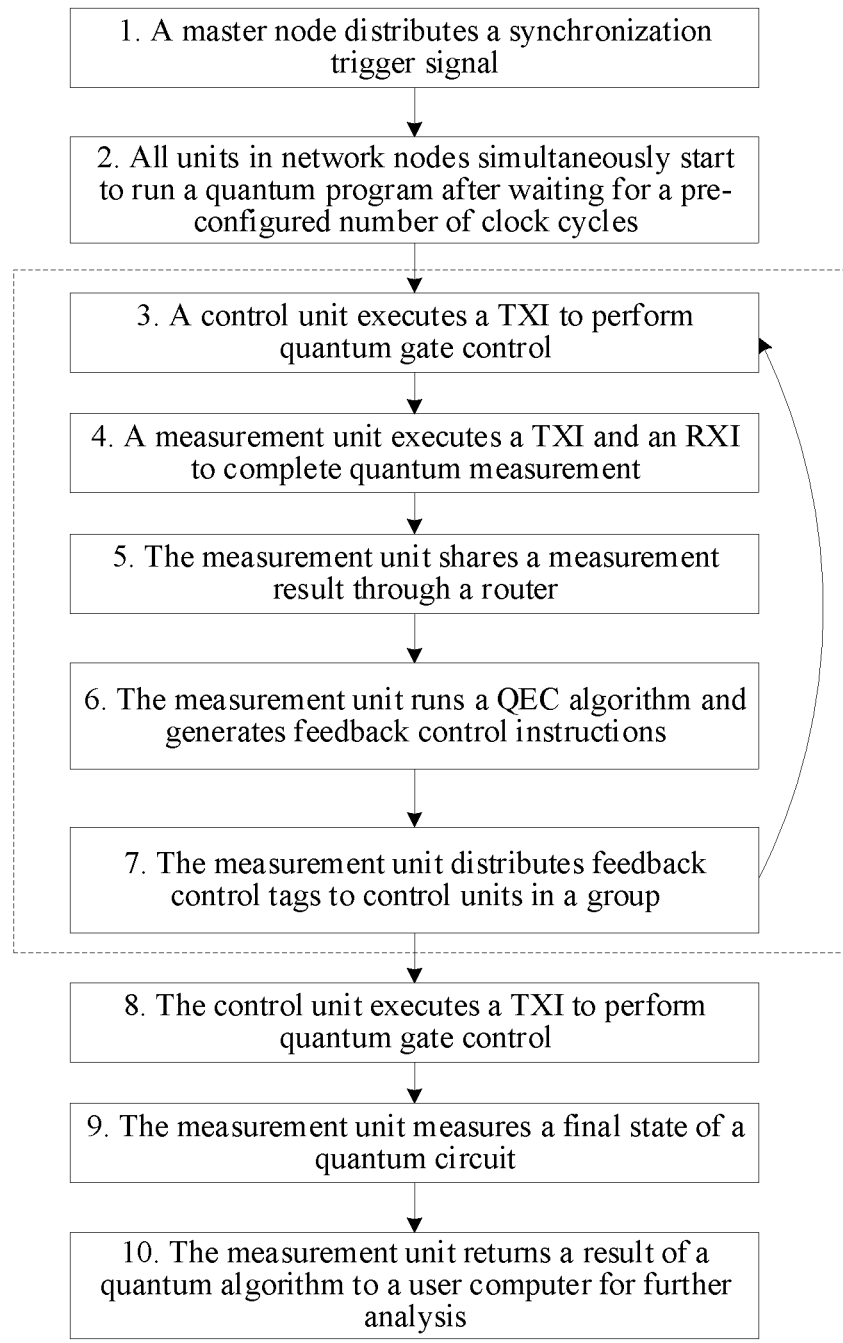
FIG. 9 is a schematic diagram of a program execution process of a QMC system according to one or more embodiments of the present disclosure.

FIG. 9 is a schematic diagram of a program execution process of a QMC system, a part shown in a dashed box being QEC macro instructions, which implements a logical qubit under protection of a QEC code.
 1. A master node distributes a synchronization trigger signal.
 2. All units in a network node simultaneously start to run a quantum program after waiting for a pre-configured number of clock cycles.
 3. A control unit executes a TXI to perform quantum gate control.

4. A measurement unit executes a TXI and an RXI to perform quantum measurement.
5. The measurement unit shares a measurement result through a router.
6. The measurement unit runs a QEC algorithm and generates feedback control instructions.
7. The measurement unit distributes feedback control tags to control units in a group.
8. The control unit executes a TXI to perform quantum gate control.
9. The measurement unit measures a final state of a quantum circuit.
10. The measurement unit returns a result of a quantum algorithm to a user computer for further analysis.

In the embodiments of the present disclosure, a distributed network structure and a programming model of MIMD are adopted, so that a system bandwidth may be used more effectively to improve a running speed of the quantum program.

In the present disclosure, a novel system network architecture applied in the field of superconducting QMC is provided, which greatly reduces a delay of feedback control. For example, a two-dimensional mesh network interconnection mode is adopted. Compared with linear connection, a feedback delay between MCSGs is reduced from O(N) to $O(N^{0.5})$. For example, assuming that there are 100 MCSGs, if the linear connection is used, a delay between the MCSGs is 100, but if a two-dimensional mesh network structure is adopted, a maximum delay between the MCSGs is 2×10−1.

A networking manner of the present disclosure is flexible and facilitates integration. In the present disclosure, a manner that software defines hardware is adopted. A structure of each MCSG may be customized according to an actual quantum chip structure. A hardware controller/accelerator may further be added to a virtual node, and finally, an entire system is implemented on an FPGA board cluster. A customized virtual node and an MC instruction set does not depend on a specific hardware circuit board, and it may not be needed to design a centralized control board.

The solutions shown in the present disclosure may reduce costs. Each MCSG can work individually or form a work group, and the number of control boards in each MCSG can also be easily expanded. The solutions are applied to small-scale dedicated quantum chips and general quantum chips with 100+ integration. In the solutions shown in the present disclosure, pulse sequence synchronization and measurement data exchange are performed between groups through a two-dimensional mesh network, and a control unit in each group generates feedback control based on the measurement data. A quantum compiler developed based on a quantum instruction set in the present disclosure can convert a quantum algorithm of a surface code into a QMC instruction, to implement quantum feedback control.

The ISA defined in the present disclosure is a simplified instruction set system. This system defines a basic pulse waveform read from a main memory and a reference waveform used for demodulation, which brings a plurality of advantages. First, because a time schedule is set by a host, a sequence of each measurement channel and control channel can be optimized. Second, before a quantum program is run, pulse waveform and measurement reference waveform data may need to be pre-loaded into a corresponding MC unit. When a user runs a quantum program, only a new gate operation may need to be loaded, and waveform data of a quantum gate used in a previous program is multiplexed, which greatly reduces data transmitted from the host to a board and improves running efficiency. Third, during running, variables can be dynamically set by the host. This feature is useful for adaptively calibrating a multi-qubit system, for example, adjusting a feedback threshold. Generally, the ISA naturally supports feedback/feedforward control and multi-signal qubits and multi-target qubits. In addition, this ISA imitates features of any suitable computer model, for example, a memory operation, branching, and MIMD. Therefore, the ISA has the prospect of integration with a classic processor. In the future, more complex functions can be built on the ISA, for example, a compiler for a quantum feedback program, a hardware accelerator for an error correction code, and a quantum feedback running environment.

Figure 10:
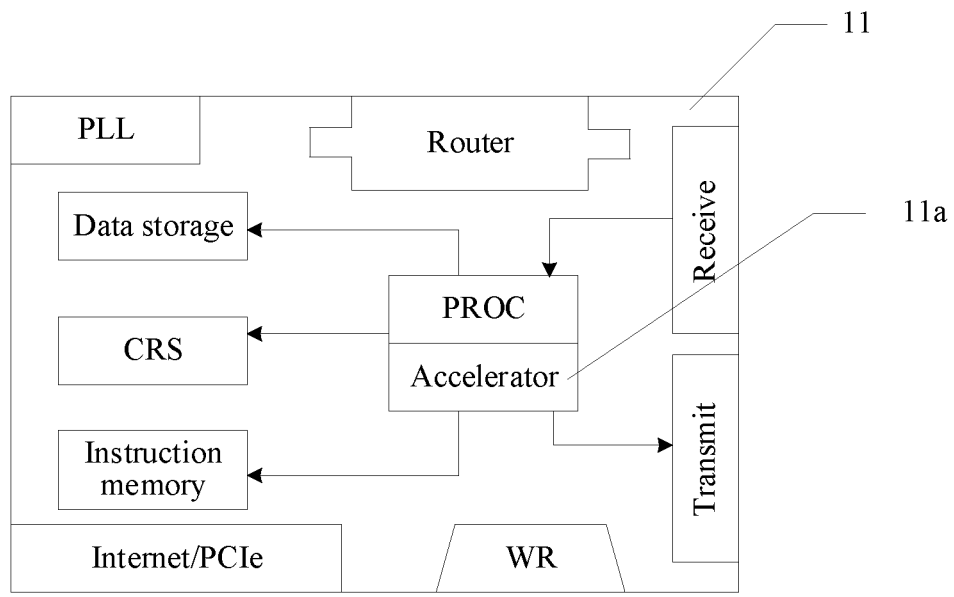
FIG. 10 is a schematic structural diagram of a measurement unit according to one or more embodiments of the present disclosure.
Figure 11:
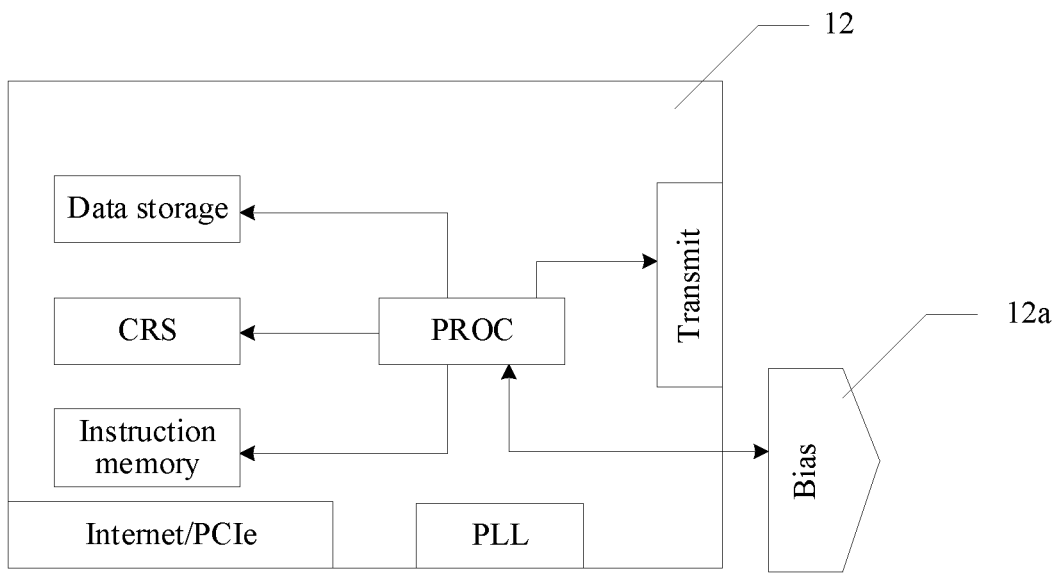
FIG. 11 is a schematic structural diagram of a control unit according to one or more embodiments of the present disclosure.

In addition, in some extended embodiments, a hardware accelerator may be added to the measurement unit to improve a measurement speed. For example, as shown in FIG. 10, a supervisory neural network accelerator 11*a* may be added to a measurement unit 11 to improve accuracy and a speed of analyzing a measurement signal. As shown in FIG. 11, a low-noise direct current bias channel 12*a* may be added to a control unit 12 to facilitate adjustment of an operating point of each bit. In addition, a general-purpose processor may be integrated at each node, so that entire hardware supports a C language or a higher-level general programming language, to facilitate development and promotion of a quantum programming language.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In certain embodiments, the term "plurality of" mentioned in the present disclosure means two or more. In addition, the step numbers described in the present disclosure merely exemplarily show an execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A quantum measurement and control (QMC) system, comprising a measurement and control (MC) network including a plurality of measurement and control subgroups (MCSGs), each MCSG being used as a node in the MC network and having a connection relationship with at least one another MCSG;
   each MCSG being configured to perform MC on a physical quantum bit (qubit) group, and the physical qubit group including a plurality of physical qubits;
   each MCSG including a measurement unit and a plurality of control units, and each of the plurality of control units being configured to control a corresponding one of the plurality of physical qubits;

the measurement unit being configured to measure a quantum state of the one of the plurality of physical qubits, and transmit a control instruction to the corresponding control unit of the plurality of control units based on the quantum state as measured; and each of the plurality of control units being configured to control the corresponding one of the plurality of physical qubits according to the control instruction, wherein a wormhole router is integrated on a physical board on which the measurement unit of the MCSG is located, the wormhole router comprises a plurality of ports, a physical transmission channel is formed through corresponding ports between wormhole routers of two MCSGs having the connection relationship, and the wormhole router is configured to split a data packet into one or more flits of a fixed length and transmit the one or more flits.

2. The system according to claim 1, wherein the physical transmission channel is a bidirectional data transmission channel.

3. The system according to claim 2, wherein the bidirectional data transmission channel includes two unidirectional data transmission channels, each unidirectional data transmission channel corresponds to a plurality of virtual transmission channels, and in response to determining that data packets from different transmission paths use the same unidirectional data transmission channel, the data packets from different transmission paths occupy different virtual transmission channels, and data transmission is performed in sequence between the virtual transmission channels according to a set flow control policy.

4. The system according to claim 1, wherein the MC network is a two-dimensional mesh network.

5. The system according to claim 1, wherein
the measurement unit and the control unit in the same MCSG are deployed in the same physical board; or
the measurement unit and the control unit in the same MCSG are deployed in different physical boards, and there is a unidirectional inter-board transmission channel between the measurement unit and the control unit in the same MCSG.

6. The system according to claim 1, wherein the MCSG corresponds to node coordinates, and the node coordinates are used for identifying a location of the MCSG in the MC network.

7. The system according to claim 6, wherein a data packet transmitted by a first MCSG in the MC network to a second MCSG in the MC network comprises:
coordinate information of a source node, including node coordinates corresponding to the first MCSG;
coordinate information of a destination node, including node coordinates corresponding to the second MCSG; and
data content.

8. The system according to claim 1, wherein the MCSG is configured with a corresponding memory space, and the measurement unit and the control unit in the same MCSG share the memory space of the corresponding MCSG.

9. The system according to claim 1, wherein
a node at a target location in the MC network is a master node, and nodes at other locations in the MC network than the target location are slave nodes;
the master node is configured to transmit a synchronization trigger signal to each slave node; and
the slave node is configured to determine a clock cycle for starting work according to a clock cycle of the received synchronization trigger signal and a pre-configured number of waiting cycles, clock cycles for starting work of the nodes in the MC network being the same.

10. The system according to claim 1, further comprising: a reference clock source and a clock distributor, wherein:
the reference clock source is configured to generate a system reference clock;
the clock distributor is configured to distribute the system reference clock to a phase-locked loop (PLL) of each physical board; and
the PLL is configured to generate working clocks of the measurement unit and the control unit on the physical board, and generate sampling clocks of an analog-to-digital (AD) conversion circuit and a digital-to-analog (DA) conversion circuit on the physical board.

11. The system according to claim 1, wherein a random phase difference between the MCSGs is compensated for by using software.

12. The system according to claim 1, wherein a signaling format of the control instruction includes a first field and a second field, the first field being used for filling a start bit of the control instruction, and the second field being used for filling a code bit of the control instruction.

13. A method of performing measurement and control (MC) via a quantum measurement and control (QMC) system, the MC system includes a plurality of measurement and control subgroups (MCSGs), each MCSG being used as a node in the MC network and having a connection relationship with at least one another MCSG, each MCSG including a measurement unit and a plurality of control units, the method comprising:
performing, by each MCSG, MC on a physical quantum bit (qubit) group, the physical qubit group including a plurality of physical qubits;
controlling, by each of the plurality of control units included in each MCSG, a corresponding one of the plurality of physical qubits;
measuring, by the measurement unit, a quantum state of the one of the plurality of physical qubits, and transmitting, by the measurement unit, a control instruction to the corresponding control unit of the plurality of control units based on the quantum state as measured; and
controlling, by each of the plurality of control units, the corresponding one of the plurality of physical qubits according to the control instruction, wherein a wormhole router is integrated on a physical board on which the measurement unit of the MCSG is located, the wormhole router includes a plurality of ports, a physical transmission channel is formed through corresponding ports between wormhole routers of two MCSGs having the connection relationship, and the method further comprises:
splitting, by the wormhole router, a data packet into flits of a fixed length; and
transmitting, by the wormhole router, the flits.

14. The method according to claim 13, wherein the physical transmission channel is a bidirectional data transmission channel, wherein the bidirectional data transmission channel includes two unidirectional data transmission channels, each unidirectional data transmission channel corresponds to a plurality of virtual transmission channels, and the method further comprises:
in response to determining that data packets from different transmission paths use the same unidirectional data transmission channel, occupying, by the data packets from different transmission paths, different virtual transmission channels, and data transmission is performed in sequence between the virtual transmission channels according to a set flow control policy.

15. The method according to claim 13, wherein a node at a target location in the MC network is a master node, and nodes at other locations in the MC network than the target location are slave nodes, the method further comprises;
 transmitting, by the master node, a synchronization trigger signal to each slave node; and
 determining, by the slave node, a clock cycle for starting work according to a clock cycle of the received synchronization trigger signal and a pre-configured number of waiting cycles, clock cycles for starting work of the nodes in the MC network being the same.

16. The method according to claim 13, wherein the MC system includes a reference clock source and a clock distributor, and the method further comprises:
 generating, by the reference clock source, a system reference clock;
 distributing, by the clock distributer, the system reference clock to a phase-locked loop (PLL) of each physical board; and
 generating, by the PLI, working clocks of the measurement unit and the control unit on the physical board, and generating, by the PLI, sampling clocks of an analog-to-digital (AD) conversion circuit and a digital-to-analog (DA) conversion circuit on the physical board.

17. A non-transitory computer-readable storage medium storing computer program instructions executable by at least one processor of a quantum measurement and control (QMC) system to perform a method, the QMC system includes a plurality of measurement and control subgroups (MCSGs), each MCSG being used as a node in the MC network and having a connection relationship with at least one another MCSG, each MCSG including a measurement unit and a plurality of control units, the method comprising:
 performing, by each MCSG, MC on a physical quantum bit (qubit) group, the physical qubit group including a plurality of physical qubits;
 controlling, by each of the plurality of control units included in each MCSG, a corresponding one of the plurality of physical qubits;
 measuring, by the measurement unit, a quantum state of the one of the plurality of physical qubits, and transmitting, by the measurement unit, a control instruction to the corresponding control unit of the plurality of control units based on the quantum state as measured; and
 controlling, by each of the plurality of control units, the corresponding one of the plurality of physical qubits according to the control instruction,
wherein a wormhole router is integrated on a physical board on which the measurement unit of the MCSG is located, the wormhole router includes a plurality of ports, a physical transmission channel is formed through corresponding ports between wormhole routers of two MCSGs having the connection relationship, and the method further comprises:
 splitting, by the wormhole router, a data packet into flits of a fixed length; and
 transmitting, by the wormhole router, the flits.

18. The system according to claim 1, wherein the fixed length of the one or more flits is based on a number of bits that can be simultaneously transmitted via the physical transmission channel.

* * * * *